April 11, 1967
W. W. WILLIAMS
3,313,501
PROTECTIVE DEVICE FOR TIRES
Filed Nov. 20, 1964
2 Sheets-Sheet 1
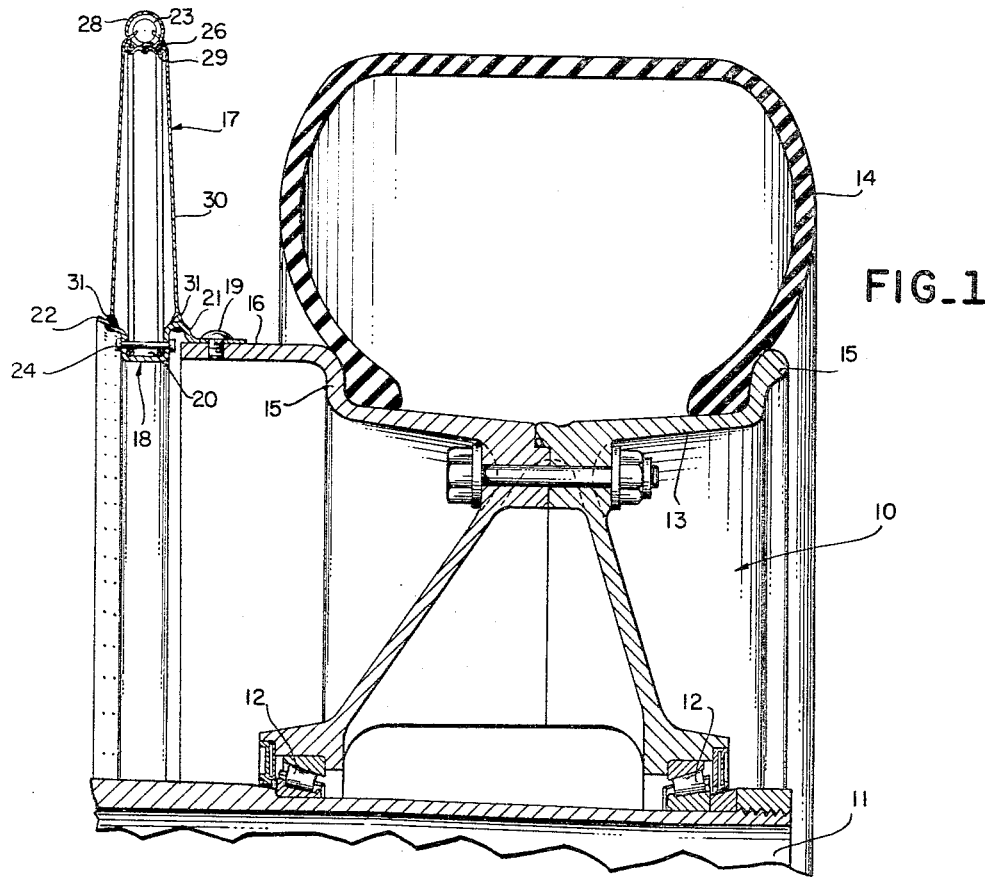
FIG_1
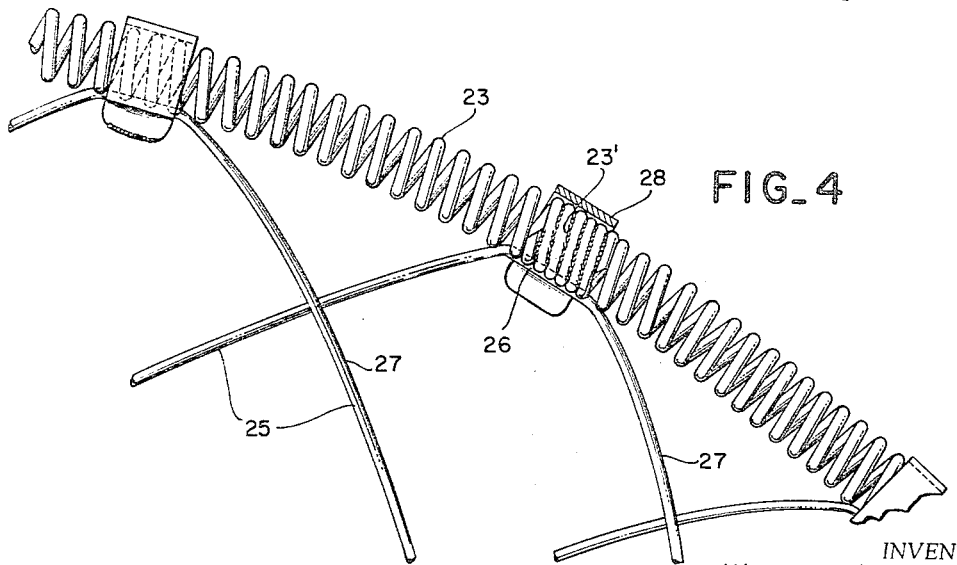
FIG_4
INVENTOR.
WILLIAM W. WILLIAMS
BY
*George Sullivan*
Agent

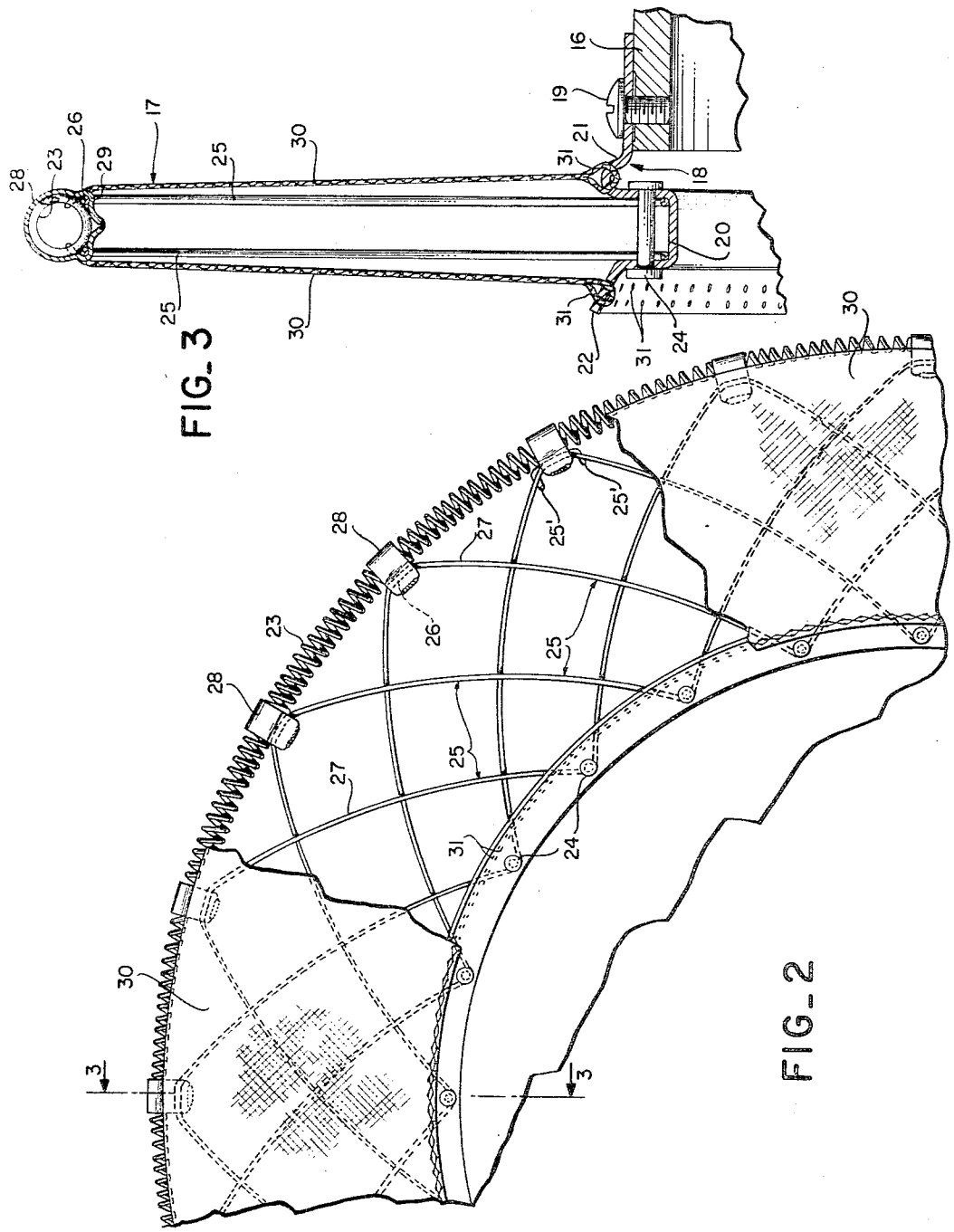

United States Patent Office 3,313,501
Patented Apr. 11, 1967

3,313,501
PROTECTIVE DEVICE FOR TIRES
William W. Williams, Atlanta, Ga., assignor to Lockheed Aircraft Corporation, Burbank, Calif.
Filed Nov. 20, 1964, Ser. No. 412,742
5 Claims. (Cl. 244—103)

This invention relates to protective device or shields, and more particularly to such a device to protect the tire of a vehicle against exposure to harmful substances and effects including ambient and environmental conditions that tend to cause the deterioration thereof.

Among its other objects, the present invention contemplates a protective device or shield that is so located relative to a tire on a vehicle that it serves as a baffle to deflect harmful substances away from the tire. Preferably this shield is fabricated of insulating material, especially one resistant to thermal and corrosive effects that appreciably shorten the life and durability of a tire during normal operation on a vehicle. At the same time, this shield is so constructed and arranged that it does not interfere with or affect normal operation of the tire and the associated wheel in its vehicle supporting and rolling function.

While not limited to, the invention has particular utility in connection with, inflatable rubber tires which are especially vulnerable in the sidewall area. Consider for example inflatable tires employed on the undercarriage of vertical rising and landing aircraft, commonly referred to as VTOL aircraft. When the lift engines of these aircraft are disposed in the vertical position, their exhaust gases are directed downwardly. When the aircraft is at this time on or very near to the ground or airfield surface, the exhaust gases strike the surface and flow horizontally therealong contacting the tires. Conventional tires cannot withstand the heat and corrosive effects thus produced. This is aggravated by the fact that optimum design considerations of lift engine locations and landing gear locations often require placing the wheels close to the exhaust of the lift engines.

The present invention proposes to overcome the foregoing as well as other shortcomings in the use of tires by providing a protective device or shield adapted to be disposed adjacent the side of a tire whereby it deflects harmful substances away from the tire at all times. The position of this shield relative to the tire is such that it does not interfere with the ambient air acting on the tire and serving to cool it.

Moreover, the material employed in the fabrication of this shield is such that it acts as an insulator to prevent the passage therethrough of effects deleterious to the material of the tire. Also, the construction of this insulating material as well as the total shield is designed to allow it to flex to the same extent as the tire when rolling over a supporting surfaces so as not to impede or otherwise interfere with such operation of the vehicle. At the same time, this shield construction is of light weight whereby the ultimate protective device is compatible with good aircraft design and yet sturdy enough to withstand forces and pressures (such as those imposed thereon when rolling over objects, skidding, sliding, etc.) of the same order of magnitude as the tire will withstand.

More specifically, the protective device contemplated by the instant invention comprises a resilient shield that is adapted to be mounted on a component of a vehicle whereby it is disposed substantially parallel to and in spaced relation with a tire thereof. Thus mounted and disposed this shield is substantially concentric with the tire and is enclosed on one or both sides by a sheet of flexible or yieldable insulating material.

With the above and other objects in view as will be apparent this invention consists in the construction, combination and arrangement of parts all as hereinafter more fully described, claimed and illustrated in the accompanying drawings wherein:

FIGURE 1 is a transverse section taken through a protective device or shields fabricated and constructed in accordance with the teachings of this invention to show its association with an inflatable rubber tire mounted on and carried by a conventional type vehicle wheel, only one symmetrical half of the assembly and a fragment of its axle being shown;

FIGURE 2 is a side elevation of a segment of the shield shown in FIGURE 1 with a portion of the insulating material removed;

FIGURE 3 is a section view taken along line 3—3 of FIGURE 2; and

FIGURE 4 is a view like FIGURE 2 showing an enlarged fragment thereof with parts broken away to reveal the construction of the shield and its assembly.

Referring specifically to the drawings, 10 designates a wheel mounted for free and unrestricted rotation on a component of a vehicle (not shown) such as an axle hub 11 through roller type bearings 12. The wheel 10 terminates peripherally in a rim 13 on which an inflatable rubber tire 14 is mounted. The rim 13 is defined on each side by a laterally projecting lip 15 constituting the felly of the wheel 10 whereby the inflated tire 14 is immovably secured thereon.

In order to accommodate a protective device or shield 17 for the tire 14 as herein proposed, one or both lips 15 are formed or otherwise provided with an extension 16 which projects outwardly therefrom to lie in a plane substantially parallel to the axis of rotation of the wheel 10. The shield 17 constitutes a resilient, annular, relatively thin member adapted for connection to the extension 16 to be disposed substantially parallel to the tire 14 and its wheel 10. Thus mounted, the shield 17 lies in predetermined spaced relation to the inflated tire 14 being substantially coextensive in diameter therewith. Preferably the radial dimension of the shield 17 is greater than that of the associated tire 14 to the end that it extends slightly beyond the associated sidewall surface of the tire in the ultimate assembly.

More specifically, the shield 17 comprises a ring 18 constituting an inner rim therefor that defines the inner radial edge of the annular shield. This ring 18 is immovably secured, for example, by a plurality of screws or bolts 19, at and along its marginal edge portion to the outer surface of extension 16. The transverse dimension of the ring 18 establishes the position of the shield 17 relative to the tire 14 whereby a predetermined space is provided therebetween.

Adjacent its outer or free end, the ring 18 is bent inwardly toward the axle hub 11 to form a channel 20. The portions of the ring 18 defining the channel 20 are bent in the opposite direction to form a bead 21 on the inner side thereof and a lateral projection 22 on the outer side thereof.

Outwardly of, in spaced relation to, the ring 18 is a toroidal spring 23 formed in a circle, for example by bringing the ends thereof together in overlapping telescoped relation, where they are secured as at 23′ (FIGURE 4) by welding or the like. Thus formed the spring 23 is concentrically disposed about the ring 18 and retained in such position by an interconnecting lattice of resilient material. To this end a plurality of spaced studs, for example rivets 24, are provided across the channel 20 each being secured to the sidewalls thereof with its medial portion or shank located in the channel in spaced relation to the base wall thereof.

One or more continuous strips 25 of spring material are made to pass around the shank of each rivet 24 adjacent the base wall of the channel 20 and project outwardly therefrom to the inner periphery of the ring formed by the spring 23 where they turn and extend a predetermined distance, as at 26, substantially tangential thereto. The several portions 26 of all strips 25 are thus disposed in a common plane and concentric about the ring 18. Each strip 25 is bowed, as at 27, in the portion or segment thereof between each rivet 24 and portion 26 with successive bows 27 curving in opposite directions to insure the concentric position of the spring 23 relative to ring 18 and to limit the resilient movement of the spring to a radial direction.

Preferably, a series of spring strips 25 as above described is employed adjacent each sidewall of the channel 20 to constitute supporting side lattices of the protective device or shield 17. Each of these lattices is connected to the spring 23 by an annular split clip 28 designed and adapted to clampingly engage the periphery of the spring 23 with its adjacent ends disposed inwardly of the spring, i.e., toward the channel 20. Adjacent its ends, each clip 28 is bent, as at 29, to thereby provide a pair of grooves or corrugations which receive and clampingly engage portions 26 of the associated spring strips 25 in opposition to the spring 23 when the clip ends are interconnected as by welding or the like. Thus assembled, the bowed segments 27 of each strip 25 are in effect secured between the rivets 24 and clips 28 and constitute resilient spokes between the inner rim or ring 18 and the outer rim or spring 23.

In order to facilitate the manufacture and assembly of each continuous strip 25 as above described, it may be produced in generally oblong pieces of crenelate form. The ends may thereafter be forced or drawn toward each other to produce its circular or annular form, each extremity being laterally disposed, as at 25' (FIGURE 2), to engage and retain it in a clip 28, as previously described.

When assembled on the wheel 10 in the foregoing manner, the outermost surface of the spring 23 is disposed in the plane of the tread of the associated tire 14 when inflated and without the weight of the vehicle thereon or preferably slightly outward thereof. This is to insure constant contact of the spring 23 with the surface on which the vehicle is resting or rolling and, in the case of VTOL aircraft, to insure total baffling or deflection and obstruction to the exhaust gases that might otherwise contact the tire 14 when the vehicle is airborne.

An annular disc 30 of comparatively flexible insulating material, preferably one that is temperature- and corrosion-resistant, overlies and thereby totally covers at least one of the outer sides of the resilient lattices formed by the strips 25. Preferably, each such disc is a fabric of knitted quartz glass threads or fibers. Adjacent its inner edge each annular disc 30 is secured to the ring 18 which may be perforated, as at 31, at and along the projection 22 and bead 21, respectively, to facilitate this by means of and through loops 31 formed or otherwise provided on this edge of the disc 30. At its outer edge each annular disc 30 is secured to the spring 23 preferably by sewing it to or interweaving it with the several turns or windings thereof.

What is claimed is:

1. A protective device for the tire of a vehicle comprising a shield having an effective total diameter at least equal to that of said tire mounted on and projecting from a component of said vehicle in a plane substantially parallel to and spaced from said tire and substantially concentric therewith, said shield being an annulus with its inner radial edge defined by a ring immovably secured to said component against radial movement and its outer radial edge connected to said ring by a plurality of resilient spokes, at least one side of said shield being defined by a sheet of insulating material resistant to effects deleterious to the material of the tire.

2. The device of claim 1 wherein said outer radial edge is defined by the periphery of a toroidal spring formed in a ring with the ends thereof overlapped and engaged one with the other.

3. The device of claim 1 wherein said spokes are formed by at least one lattice of resilient material.

4. The device of claim 3 wherein each said lattice is formed by at least one continuous strip extending alternately to and from said ring and said outer radial edge with the successive portions of said strip disposed between the edges aforesaid being bowed equally in opposite directions.

5. The device of claim 3 wherein each said lattice is formed by a plurality of continuous strips each extending alternately to and from said ring and said outer radial edge with the successive portions of each said strip disposed between the edges aforesaid being bowed equally in opposite directions, each said strip being in substantially the plane of and spaced relation to every other strip.

References Cited by the Examiner

UNITED STATES PATENTS

| 1,083,009 | 12/1913 | Glasser | 152—12 |
| 1,200,061 | 10/1916 | Wentworth | 301—37 |
| 1,345,827 | 7/1920 | Bohannon | 152—12 |
| 1,403,446 | 1/1922 | Rothmann | 280—156 |
| 1,421,239 | 6/1922 | Hundleby et al. | 280—156 |

FOREIGN PATENTS

| 397,372 | 2/1909 | France. |

MILTON BUCHLER, *Primary Examiner.*

L. C. HALL, P. E. SAUBERER, *Assistant Examiners.*